(12) United States Patent
Wittke et al.

(10) Patent No.: US 11,244,021 B2
(45) Date of Patent: Feb. 8, 2022

(54) USER INTERFACE FOR CREATING AND MANAGING URL PARAMETERS

(71) Applicant: salesforce.com, inc., San Francisco, CA (US)

(72) Inventors: Eric Wittke, Chicago, IL (US); Andy Banks, Greenwood, IN (US); Rick Muñoz, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/927,797

(22) Filed: Jul. 13, 2020

(65) Prior Publication Data

US 2022/0012299 A1 Jan. 13, 2022

(51) Int. Cl.
  *G06F 17/00* (2019.01)
  *G06F 16/955* (2019.01)
  *G06F 16/957* (2019.01)
  *G06F 3/0484* (2022.01)

(52) U.S. Cl.
  CPC ...... *G06F 16/9566* (2019.01); *G06F 3/04847* (2013.01); *G06F 16/957* (2019.01); *G06F 16/9558* (2019.01)

(58) Field of Classification Search
  CPC .............. G06F 16/9566; G06F 16/9558; G06F 16/957; G06F 3/04847; G06F 15/16; G06F 16/337; G06F 16/9535; G06F 3/0482; G06F 40/18; G06F 16/25
  USPC .......................................... 707/706
  See application file for complete search history.

(56) References Cited

U.S. PATENT DOCUMENTS 7,152,116 B1 * 12/2006 Austin .............. H04L 29/12594
                                                                 709/245
2018/0232351 A1 * 8/2018 Singh ................... G06F 16/337

* cited by examiner

*Primary Examiner* — Jason T Edwards
(74) *Attorney, Agent, or Firm* — Sterne, Kessler, Goldstein & Fox P.L.L.C.

(57) ABSTRACT

Described herein is a method, system, and non-transitory computer readable medium for generating composite uniform resource locator (URL) parameter strings, to aid administrators of businesses and other owners of websites who may want to determine statistics about their target audiences in an intuitive and efficient manner. In order to do so, individual URL parameter units, wherein each URL parameter unit may represent a simple assignment or simple logical comparison of a parameter, are constructed in a modular form using a GUI. Once these individual URL parameter units are constructed, they are then concatenated into composite URL parameter strings, wherein multiple URL parameter strings can be combined to form the URL for a button sent in an email to intended recipients. When such links are clicked, the administrator user may receive audience-specific feedback at a high level of detail.

20 Claims, 13 Drawing Sheets

USER INTERFACE FOR CREATING AND MANAGING URL PARAMETERS

BACKGROUND

In today's world, customer experience is an important aspect for any organization across the world catering to a target audience. In particular, businesses often have targeted audiences with which they have or would like to build a prospective commercial relationship. In this regard, an organization's management may want to market to several customers, and may want to determine which if any of its customers is reading the company's marketing materials, accessing the company's website, etc. With increasing competition, organizations have started to focus on targeted analytics of customers and potential customers as a way of seeing which offerings are being well-received by which target audience. Accordingly, the organization's management can then tailor their products or offerings to match the target audience where such products or offerings may be well-received.

As an example, a business may seek to send an email about a product offering to different groups of target customers and gauge their response to such an email. Creating such emails to include a mechanism for the administrator to be notified of a target customer or group of target customers reading the email or visiting a website may require inserting targeted uniform resource locators (URLs) in such emails.

However, there are several technical problems associated with creating such targeted URLs. First, generating such URLs can be complex, requiring a high degree of detail, a large number of variable names, parameters, formulas, and stringing these components together in a way that satisfies protocols such as the hypertext transfer protocol (HTTP) and in a way that browser user-agents can recognize. This process is complex and error-prone, because most people who would want to create such URLs, such as common marketers or administrators, may not be familiar with scripting languages. As a result, self-service customization by generating such URLs to target different customers or audiences becomes difficult.

As a result, with a high volume of information and degree of complexity required, it is often very easy for a user such as an administrator or common marketer to make the wrong URL conveying incorrect information, incorrectly specify parameters, etc. This can cause a technical problem where there is a high likelihood that such inserted URLs will not convey useful information back to the user, or will not convey useful information at a level which matches up to the user's needs. As a result, it can be exceedingly difficult for business users (especially for small businesses) to create such URLs to perform a marketing messaging operation directed towards multiple target subscriber audiences at a large scale. Further, there is a lack of modularity, wherein due to the complexity involved, a user is not ordinarily able to blend and combine strings depending on changing usage needs over time (e.g., targeting particular combinations of groups of customers, etc).

Moreover, even if they generate the correct URL parameters, including desired complex parameters, and overcome the problems present above, there is often no opportunity for reuse of parameters.

These technical problems of complexity, volume, and efficiency encountered by administrators in constructing the URLs, among others, diminish the level and quality of information the administrators have about the needs and wants of their various target audiences, and thus significantly diminish customer experience for such business applications.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

The drawing in which an element first appears is typically indicated by the leftmost digit or digits in the corresponding reference number. In the drawings, like reference numbers may indicate identical or functionally similar elements.

DETAILED DESCRIPTION

Figure 1:
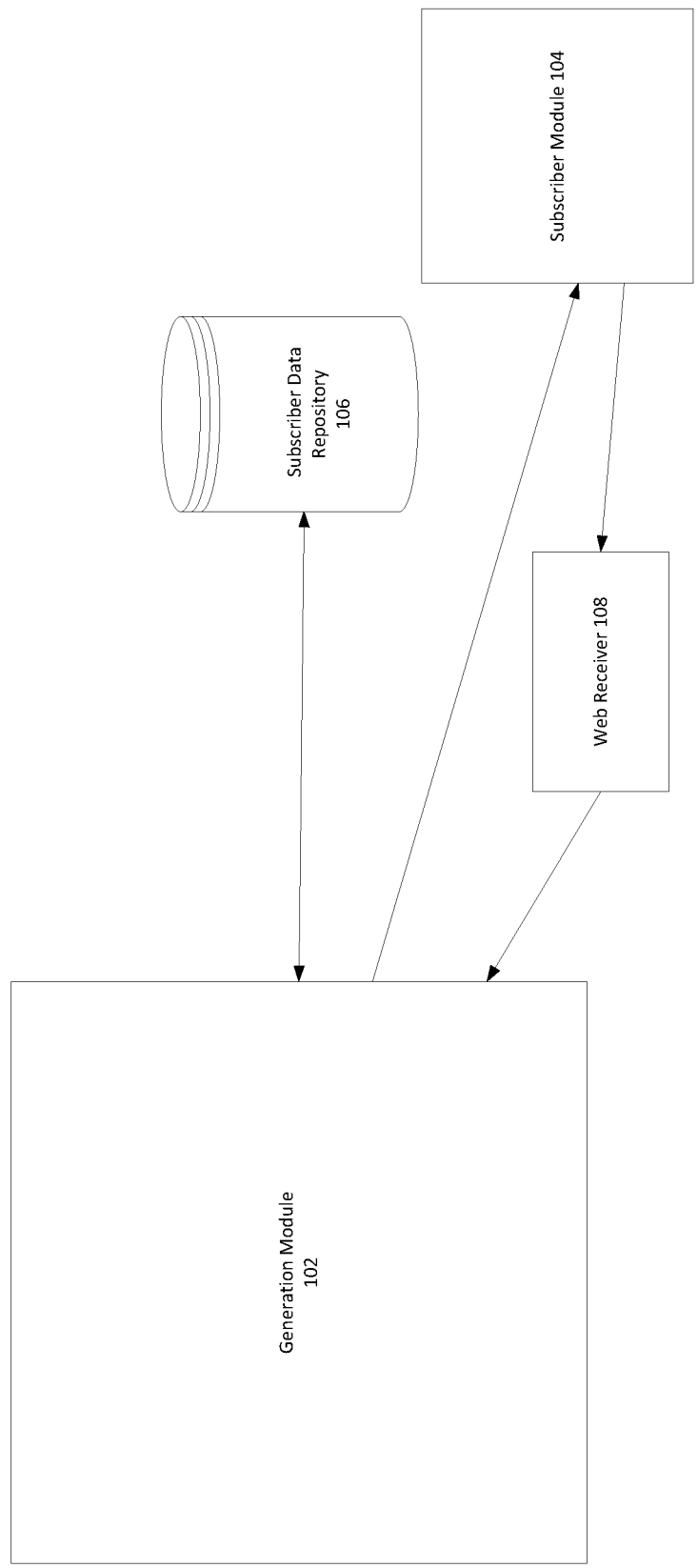
FIG. 1 is a block diagram of an example embodiment where an administrator can use a generation module for creating targeted messaging campaigns to target subscriber modules.

Provided herein are system, apparatus, device, method and/or computer program product embodiments, and/or combinations and sub-combinations thereof, for a user interface for the generating of uniform resource locator (URL) parameter strings to be inserted in communications such as email sent by website administrators to subscribers.

For example, in an email that is being sent to a particular target subscriber audience by an administrator, such an inserted URL would include markers in the URL identifying the audience that is being targeted. Then, when such a target audience clicks on the URL, the business administrator may be notified that a particular target audience has clicked on the URL. Then, through such notification an organization or business can develop metrics measuring which proportion of their target audience may be reading emails sent out, or visiting the organization's website, etc. Conversely, it follows that an organization can further determine by such URLs which products a particular target audience may or may not be receptive to, which part of the website they may not spend much time at, etc. Through the provision of such generated URL parameter strings, there is also a greater degree of modular flexibility offered wherein strings can be blended and customized based on usage over time. For example, the changing needs of a user, such as an administrator or common marketer, can be accommodated by creating strings targeting combinations of previously targeted customers by combining and blending previously used strings.

Normal business or other website administrators are not familiar with scripting languages, such as AMPSCRIPT, etc. that may be used for scripting language parameters that are used in creating these URLs. Because of this it is difficult for them to create URLs that can relay back to the administrator useful information about their potential target audiences. Writing URLs in such a situation would be a challenging endeavor, requiring wasting of a lot of time to research, refer to handbooks, etc. In addition to the above-mentioned technological problems, due to the complexity required, e.g., to represent conditional logic in a function-based parameter, the administrator may be unable to insert such a desired complex parameter into the URL.

This is compounded by the inability to reuse parameters. The inability to perform these functions can greatly hamper efficiency. For example, if URLs are to be generated for two target audiences which may share several attributes (e.g., geographic location, demographic, age, etc.), and may differ in other attributes, there is no provision to share only the parameters which are common between the two target audiences when generating two separate URLs. By having to account for each attribute for each separate target audience, this poses a technical problem of efficiency for most administrators.

The embodiments described herein solve these technological problems. The embodiments described herein utilize an intuitive modular URL parameter unit system in building URL parameter strings so as to enable a business or website administrator that is not well versed in script writing etc., to conduct a scalable marketing messaging operation. These URL parameter strings can be built by concatenating individual URL parameter units. In these embodiments, difficult code-writing aspects for making such URL parameter strings are circumvented by using a completely visual user interface, guiding the administrator through the parameters they would like to monitor to create individual URL parameter units, and then concatenating these units to create URL parameter strings. These embodiments can then embed these generated URL parameter strings, which may be generated through AMPSCRIPT code, JAVASCRIPT code, etc., in an email, webpage, etc. to generate the corresponding browser-readable syntax in a manner requiring minimal code-generation by the administrator user, unless desired. Such syntax may be in the form of HyperText Markup Language (HTML) 5 code, JavaScript Object Notation (JSON) syntax or other syntax that is recognizable by a browser.

The URL parameter strings can contain contextual information about subscribers or potential subscribers based on various aspects such as their geographic location, how they are related to the administrator or came to find out about the business, what revenue stream or customer type they fall in, what age demographic they are under, or any number of such variables. For example, the embodiments can use the generated URL parameter strings to make targeted emails that are sent to various target individuals or groups of individuals in the administrator's target audience. This can enable the computer systems of an administrator to receive feedback whenever the targeted individuals or groups of individuals may click on content present in the email. Additionally, the embodiments can also account for more advanced users that may have knowledge of coding and script-writing, etc., and provide additional features such as a modular drag-and-drop quick functions interface for easy filling in of parameters in the URL parameter unit system. In this manner, with little effort, a business or website administrator can gauge accurate statistics from their target audiences, and can cater their business or website offerings accordingly, to meet their audience's needs.

FIG. 1 is a block diagram illustrating the system arrangement for a data-transfer environment 100, according to some embodiments. In FIG. 1, the data-transfer environment 100 shows the interaction between the administrator of a website using a generation module 102, a subscriber data repository 106, a subscriber or individual forming part of the administrator's target audience using a subscriber module 104, and a web receiver 108.

The generation module 102, as well as the subscriber module 104, may be computing systems. The subscriber data repository 106 may be present on a computing system of the generation computing module 102, or in another embodiment, the subscriber data repository 106 may comprise a separate computing system. As mentioned below, the data repository 106 may also be part of a cloud computing network.

The data-transfer environment 100 may be used to process data from the subscriber data repository 106, from the generation module 102, subscriber module 104, and from web receiver 108, by a software application or software module stored in the computer system of the generation module 102. Correspondingly, the data repository 106 may comprise a database which may be stored e.g., in the computer system of the generation computing module 102, of a separate computer system, or of a computing resource in a cloud computing environment.

According to some embodiments, a software application or module generating the graphic user interfaces (GUIs), which will be described, may be stored in primary memory and/or secondary memory of computing resources of a cloud computing environment included as part of the generation module 102. If the software module is stored as part of computing resources in the generation module 102, a web application may be deployed within the cloud computing environment, giving an administrator user access to use the software modules, where said web application may be able to be accessed from the other modules in FIG. 1 such as subscriber module 104 or web receiver 108 (e.g., if the web application was deployed running software modules stored as part of the computing resources in the generation module 102, then a computer system of the web receiver 108 may be able to access the software module through the web application.)

In a similar manner, a subscriber data repository 106, which can comprise a database, may be stored in primary memory and/or secondary memory of computing resources of a cloud computing environment included as part of the generation module 102. In this manner, if the database is stored as part of computing resources in the cloud computing environment of the generation module 102, then a web application may be deployed within the cloud computing environment. Such an application may give an administrator user of the generation module 102 access to use the database.

Figure 2:
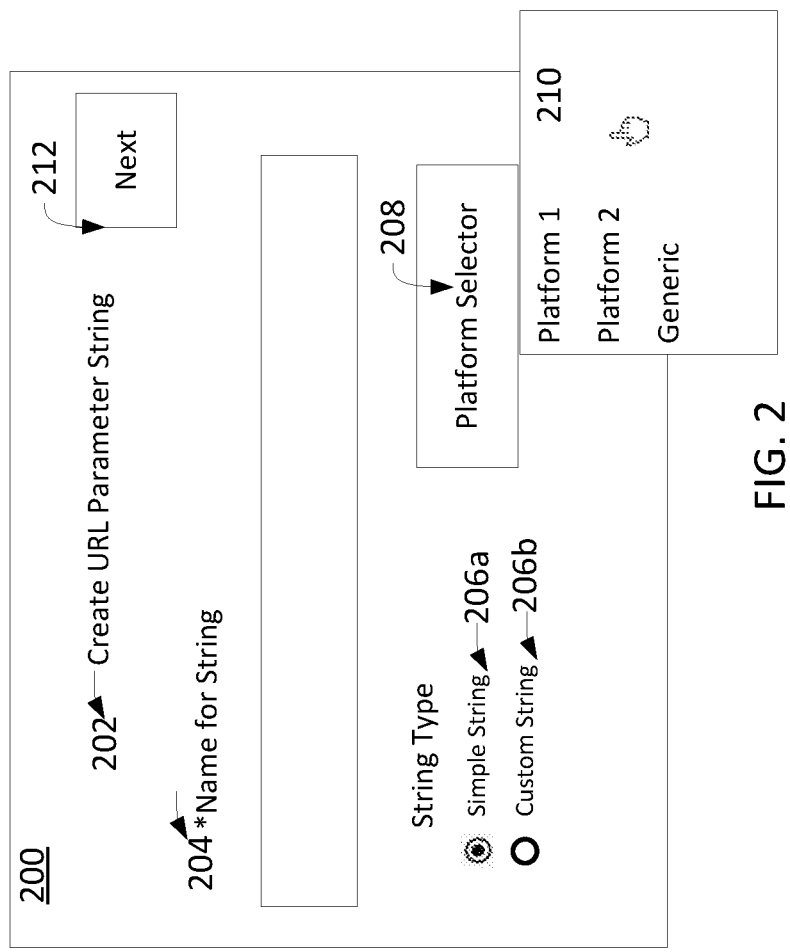
FIG. 2 is a first screen of a graphic user interface (GUI) used to create a URL parameter string, according to some embodiments.
Figure 4:
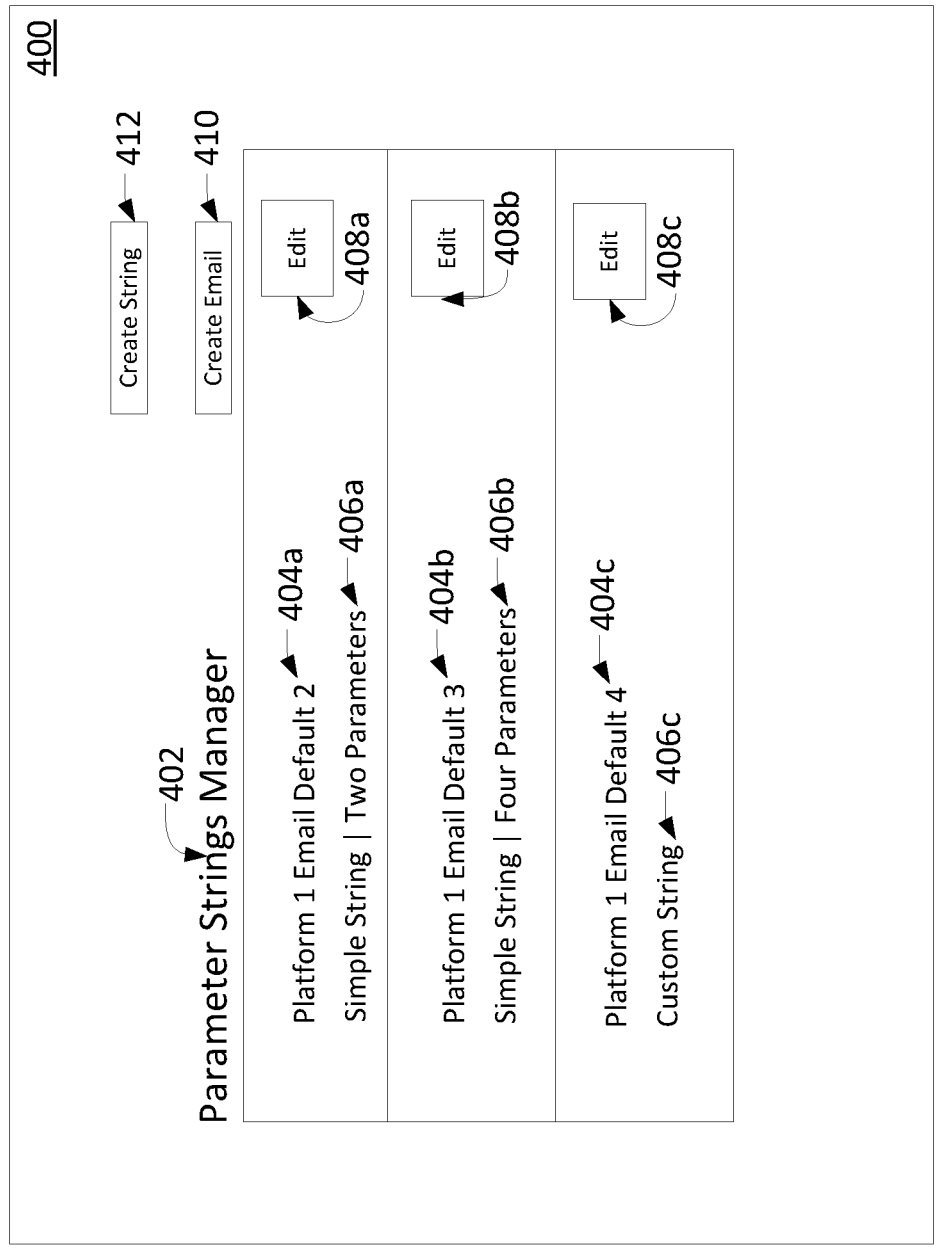
FIG. 4 is a parameter strings manager GUI, to manage and edit URL parameter strings created using the GUI of FIG. 2, according to some embodiments.
Figure 5:
FIG. 5 is an email editor GUI, to insert URL parameter strings generated using the first and second GUI of FIGS. 3A-3E, and 3F, respectively, in the body of an email to targeted subscribers, according to some embodiments.
Figure 6:
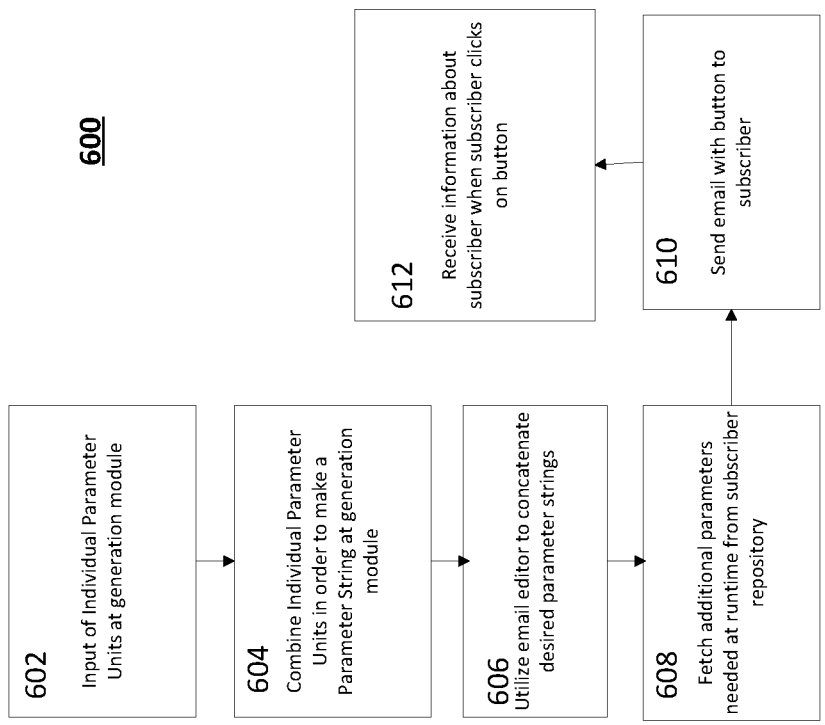
FIG. 6 is a flowchart illustrating the steps of forming a URL parameter string using the various GUIs to create and send an email to a subscriber module, and receiving information from the subscriber module, according to some embodiments.

FIGS. 2-5 are described briefly herein, before being described in the context of the overall process 600 of FIG. 6. FIG. 2 illustrates a starting GUI 200 of a software application used by an administrator user of the generation module 102, according to some embodiments. The software application may be a standalone application on a computer system of generation module 102 utilizing a CPU processor, or web-based application through a cloud computing environment hosted on generation module 102, as explained above.

Figure 3A:
FIGS. 3A-3E shows a first GUI for the inputting and deletion of parameters of a URL parameter unit for a simple string using the GUI of FIG. 2, according to some embodiments.

FIG. 3A illustrates a first GUI 300a for the input of a simple string, according to some embodiments. As the user inputs the simple string, the user proceeds through the sequence of operations on this first GUI 300a as illustrated in FIGS. 3B-3E, according to some embodiments.

Figure 3B:
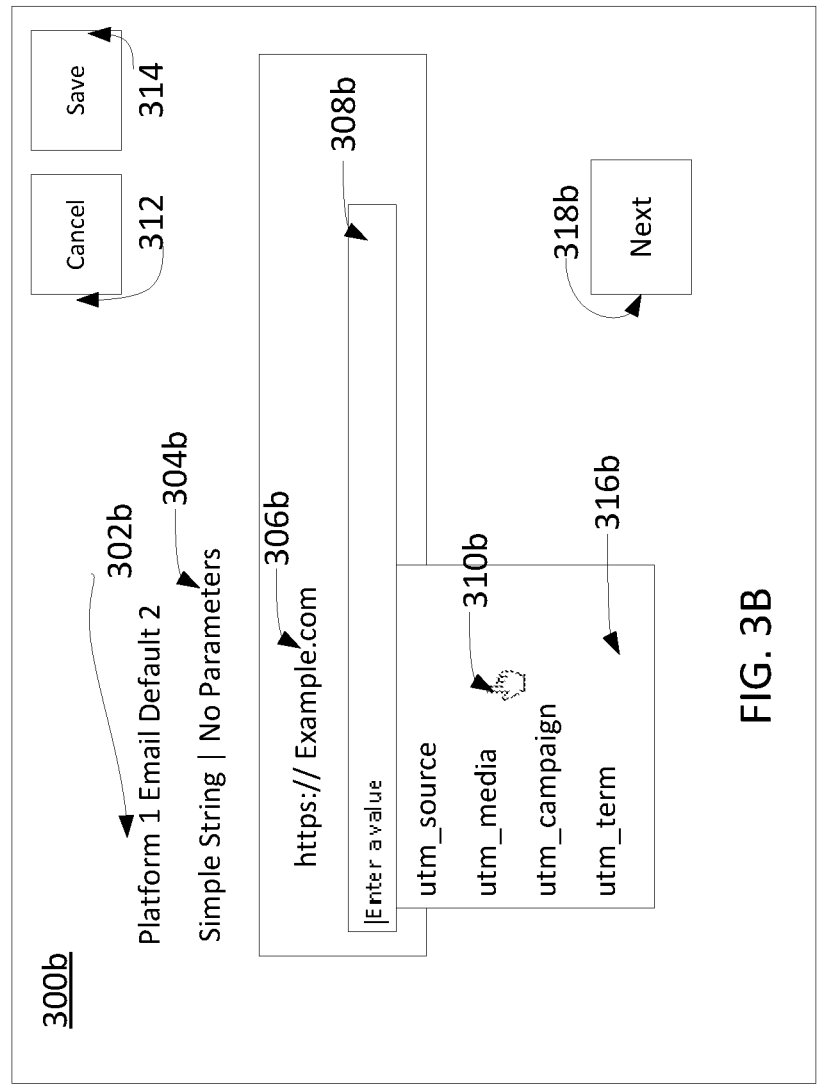
Figure 3C:
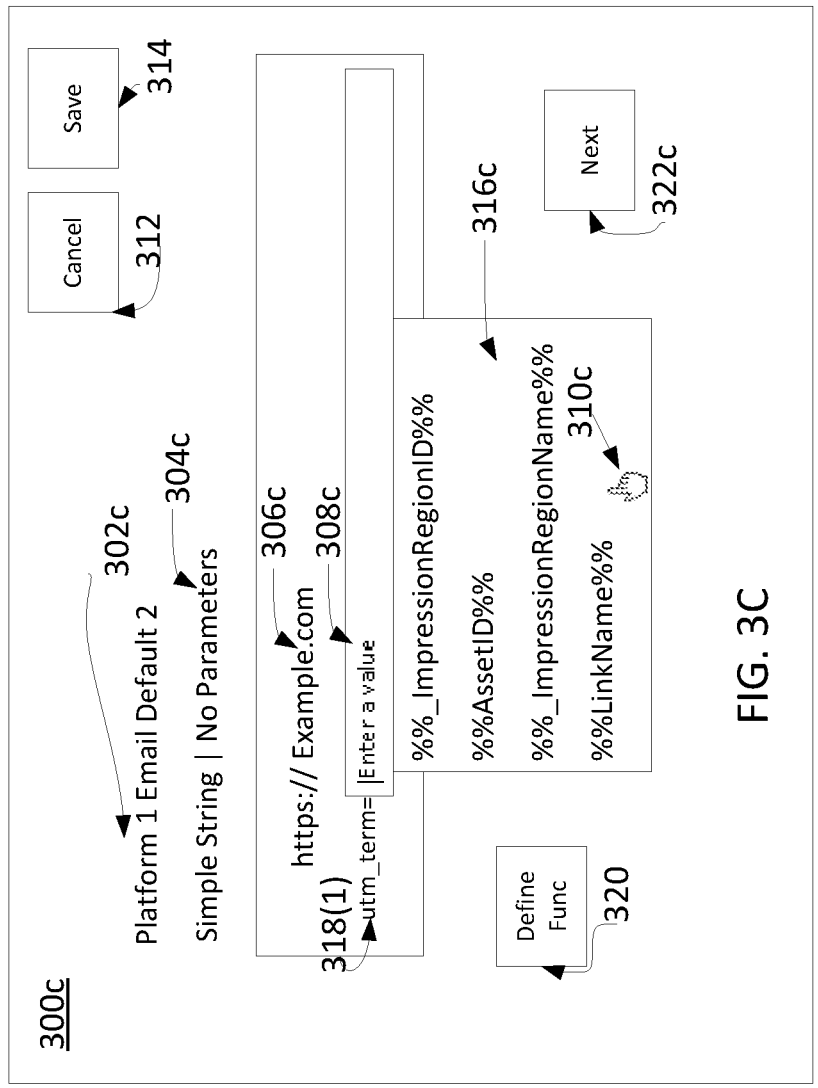
Figure 3D:
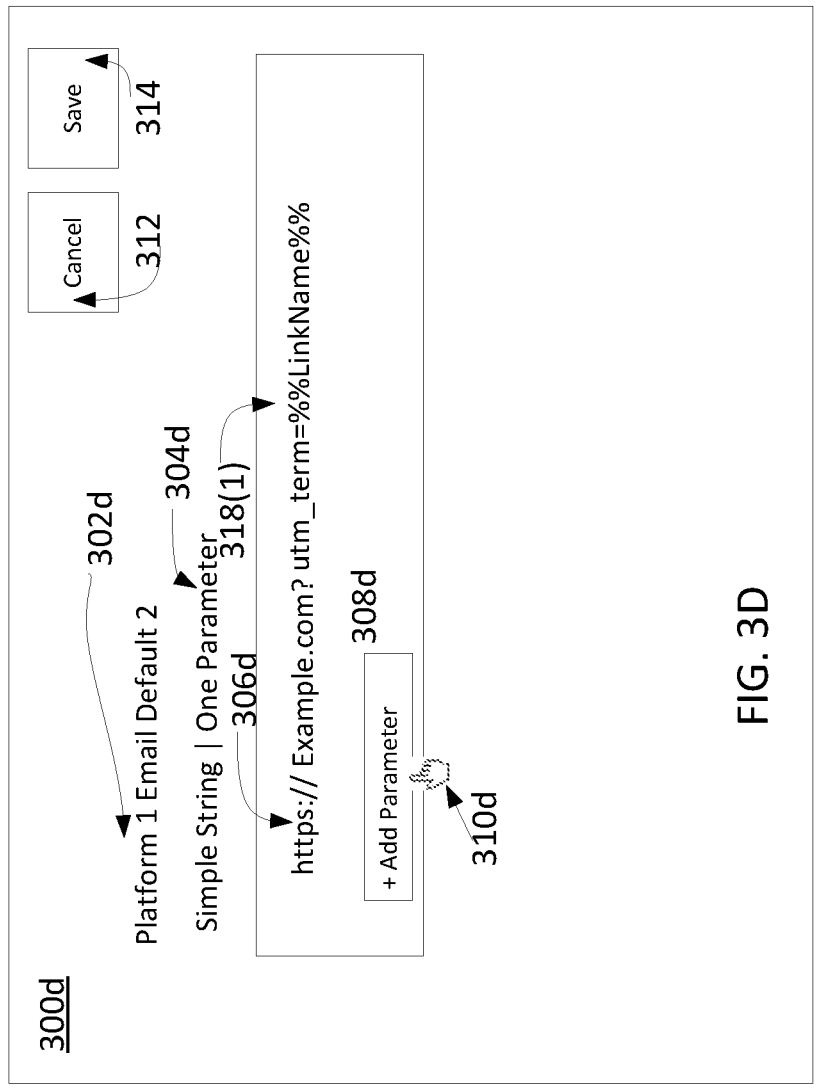
Figure 3E:
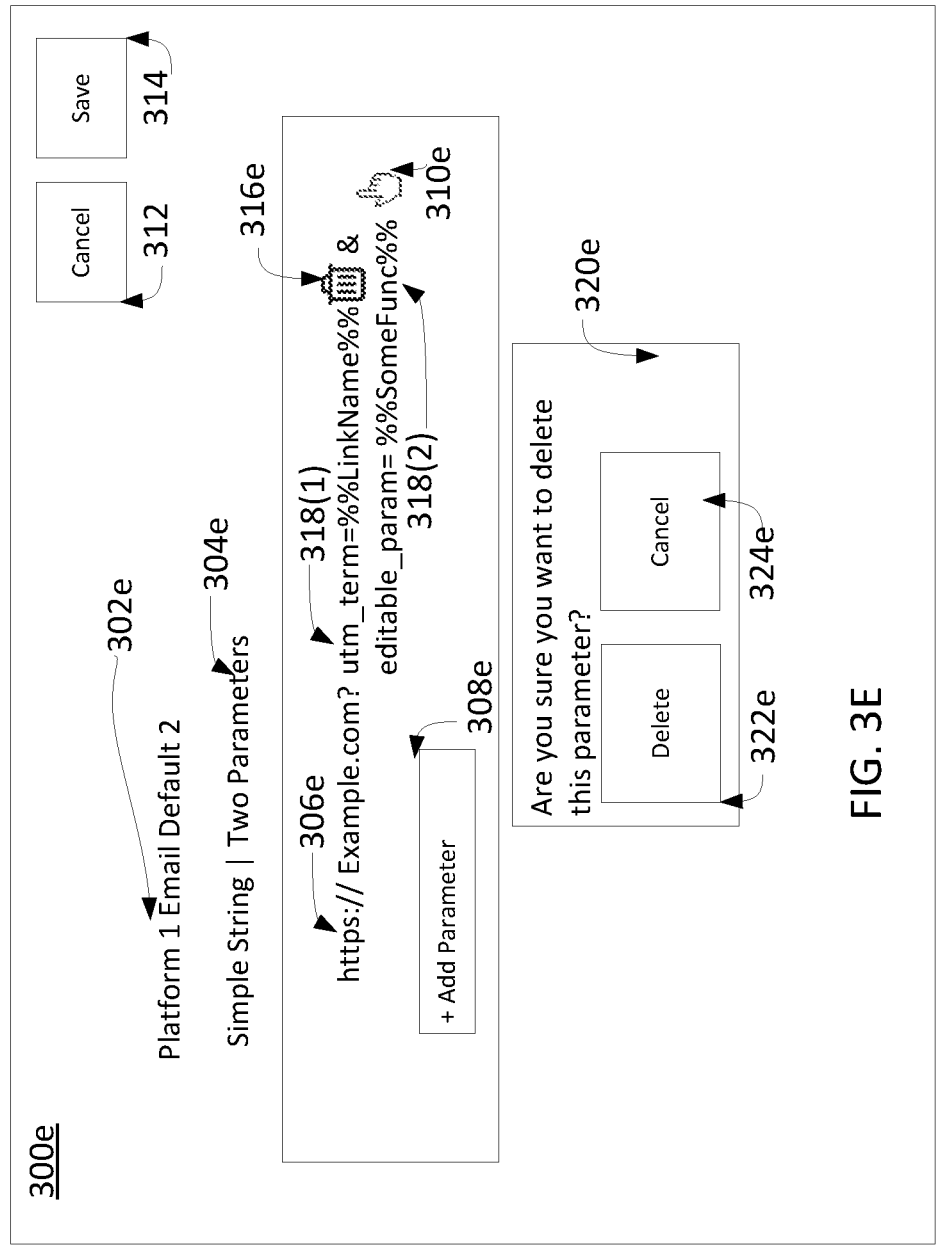
Figure 3F:
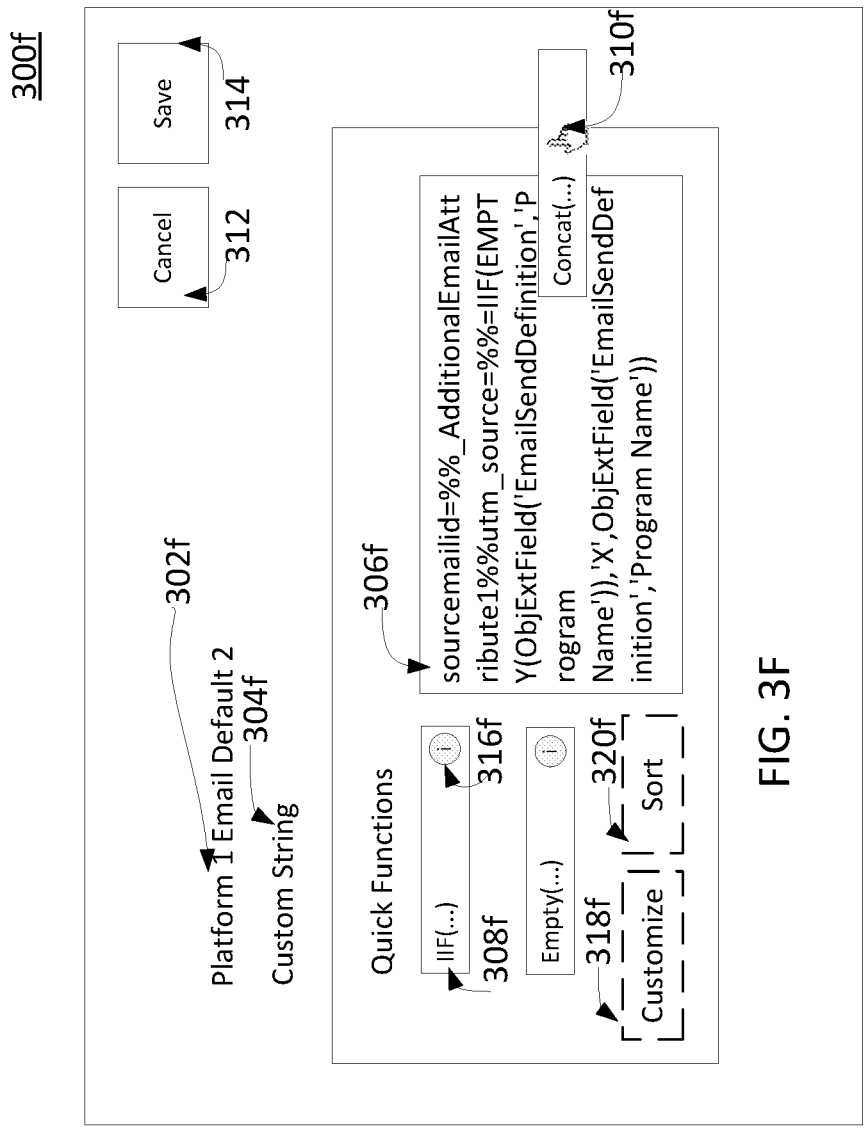
FIG. 3F shows a second GUI for the inputting and deletion of parameters of a URL parameter unit for a custom string using the GUI of FIG. 2, according to some embodiments.

FIG. 3F illustrates an alternative GUI to FIGS. 3A-3E, according to some embodiments. For example, FIG. 3F illustrates a second GUI 300f for the input of a complex string. Either the first GUI 300 of FIGS. 3A-3E or the second GUI 300f of FIG. 3F can be chosen by the administrator user depending on a selection made in FIG. 2.

FIG. 6 is a flowchart for a method 600 describing the overall process for generating URL parameter strings, inserting them in an email to be sent to various target audiences, and gathering feedback from said audiences, according to some embodiments. Method 600 can be performed by processing logic that can comprise hardware (e.g., computer systems, circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 is described with respect to FIGS. 1-5. However, method 600 is not limited to these example embodiments. Method 600 starts by getting input from the administrator at the generation module 102, at step 602. The application at this step can start at a GUI 200 shown in FIG. 2 using the component structure as laid out in FIG. 1. From this starting GUI 200 of FIG. 2, depending on the user input, the process of method 600 either proceeds to step 602 in FIGS. 3A-3D and step 604 in FIG. 3E, or alternately to steps 602 and 604 performed simultaneously in FIG. 3F, as will be explained below.

Step 602 of the process 600 includes getting the input of individual parameter units at the generation module 102 by the administrator user. For example, with respect to FIG. 2, the input process of 602 can start with the prompt "Create URL Parameter String" 202 being shown to the user, along with an editable text-field 204 for user input, with the prompt "*Name for String" displayed. In this manner, the user may input a desired name for labelling a URL parameter string, in order to categorize various portions of the administrator's subscriber base. Such a name can be chosen, for example, on a geographical basis, a product-wise basis, a demographic basis, etc. (e.g., Maryland clients, Merchandise A clients, octogenarian clients).

In FIG. 2, two string types, Simple String 206a, and Custom String 206b, are displayed with a radio-button selector that enables a user to select one of these two types. Additionally, a platform selector 208 is displayed. If the user hovers a pointer 210 over the Platform Selector 208 portion of the GUI, a further drop-down list 210 can be displayed as shown in FIG. 2, with sample entries "Platform 1" and "Platform 2." This can be indicative of several known analytical platforms, which can analyze data based on URL's that are clicked by subscribers. Such platforms may include, but are not limited to, GOOGLE ANALYTICS, PIWIK, SALESFORCE MARKETING CLOUD, etc. Selection of such a platform in drop-down list 210 can be important, because different platforms expect differently customized parameters when analyzing URL parameter strings. There may also be a "Generic" option given as a final option in drop-down list 210 in the case the user does not want to choose a specific platform, in which case the URL parameter strings are left in a general format and not customized. When the user clicks the Next button 212, the process of method 600 proceeds forward within step 602 for input of the individual URL parameter units. If no name is inputted in field 204, then a name can be auto-generated based on the selected platform (e.g., "Platform 1 Email Default 2"—this name is displayed in element 304a of FIG. 3A).

In the case where simple string is selected at step 602, the process proceeds, still within step 602, to a series of GUIs as shown in FIGS. 3A-3E, which will herein be described as a first GUI 300 for the inputting and deletion of parameters of a URL parameter unit for a simple string. FIG. 3A shows a first GUI 300 for the input of a simple string, when the simple string is selected as the string type in FIG. 2. In the case where no name was inputted in the input field 204, a default name as described above is shown in element 304a. The identifier displayed in 304c is a dynamic element that represents the current status of the URL parameter string. As the user arrives to the GUI shown in FIG. 3A without having inputted parameters, "Simple String No Parameters" is displayed. This can change during the course of user input. A sample URL is displayed in 306c, wherein as the user inputs parameters, these parameters are appended to the sample URL. This sample URL can be easily adjusted by the user, and should refer to the user's website, or website where the user wants to direct traffic to be received by the web receiver 108 when a subscriber clicks on a button present in an email they receive. The user can then easily add parameters by simply moving the pointer 310a to the Add Parameter button 308a, and clicking said button. At any point in time, the user can save his progress in creating the URL Parameter String by clicking the Save button 314, or may promptly exit the process by clicking the Cancel button 312. This functionality of the Save button 314 and Cancel buttons 312 can be the same as present throughout FIGS. 3A-3F.

Upon clicking the "Add Parameter" button 308a in FIG. 3A, the first GUI as shown in FIG. 3B is shown by the processor of the generation module 102 to the user. In this case, depending on the platform the user chose in the platform selector 208 of FIG. 2, a drop-down list of pre-populated parameters 316b can appear that is specific to the platform. If a generic platform is chosen, then generic parameters (e.g., "source" instead of "utm_source", etc.) may be displayed in 316b. The administrator user may move their pointer 310b to the drop-down list and select an element in 316b, wherein upon such a selection being made the corresponding parameter is displayed in the text-editable field 308b. The user is free to select any of the parameters in 316b, and edit these parameters once selected, or type in their own parameter if it is not displayed in 316b. Once the input has been entered, as with FIG. 2, the user clicks the Next button 318b to move forward in the process, within step 602, for the inputting of an individual URL parameter unit.

At this point, the first GUI 300c as shown in FIG. 3C is shown by the processor to the user. Here, the selected parameter from FIG. 3B, 318(1) appears with an "=" sign as a default operator for assignment. If the user moves the pointer 310c over the operator sign in 318(1), a drop down list can appear with other operators or other equivalency conditions including relational and/or logical operators such as "!=" representing an inequality, "==" representing equivalency, "||" representing OR, "&&" representing AND, etc., which can also be chosen. The value to which the parameter is assigned is gathered from the user-input in a text-editable field 308c, which has the starting prompt "Enter a value." This value may be, for example, on the right-hand side of the operation or equivalency condition. Again, a list of common values which may be dependent on the platform selected in FIG. 2 may be displayed in drop-down 316c, similar to the display in FIG. 3B. It is worth noting that a numerical value, etc., may also be written in 308c, e.g., as the value to which a parameter may be assigned if the operator is "=". Depending on the parameter, a numerical value or second parameter may be input into the text field 308c. Once the user maneuvers the pointer 310c and clicks on a common value/parameter in drop-down 316c, the text of the common value/parameter appears in field 308c and the user is free to edit this value. Alternately, the user can enter their own value in field 308c. The parameter of 318(1), the operator or equivalency condition selected, and the value from field 308c jointly form, collectively, a simple assignment, or simple logical comparison. This simple assignment, or simple logical comparison, in turn, forms an individual URL parameter unit. The parameter of 318(1) reflects a single individual parameter unit inputted at step 602.

Further alternately, if the parameter or value to be entered in field 308c may depend on more complex logic, such as conditional logic, a loop structure, etc., the user may define a function to represent the value in field 308c, by clicking on a Define Func button 320. Doing so opens up a second GUI 300f as shown in FIG. 3F, within the first GUI 300c, in a window-within-window configuration, wherein once the user presses save 314 in the second GUI 300f, the value of text-field 306f is inputted into the field 308c of FIG. 3C. Once the value of the second parameter is inputted into field 308c, this can complete the formation of a first URL parameter unit at step 602. Each URL parameter unit, representing a parameter, can comprise a first parameter (e.g., "utm_term" in FIG. 3C), operator (e.g., "=" in FIG. 3C), and value or second parameter assigned to the first parameter (e.g., "%%LinkName%%" as chosen by the pointer in FIG. 3C). Once the user is finished inputting the value into field 308c, they may click the Next button 322c to move further in the process of method 600, still within step 602.

At this point, the first GUI 300d as shown in FIG. 3D is shown by the processor to the user, for the continued input of a simple string at step 602. The status 304d, in contrast to the previous statuses 304b and 304c, is now updated from "Zero Parameters" to "One Parameter," to reflect the added first URL parameter unit of FIG. 3C. The first URL parameter unit 318(1), as defined by the input in FIG. 3C, is appended in its full form to the sample URL 306d. The user can then click the "Add Parameter" button 308d again with pointer 310d to add a second URL parameter unit to the sample URL 306d. In this manner, as shown in steps FIGS. 3A-3D, a plurality of URL parameter units may be added to the URL parameter string. All of these URL parameter units can still be added at step 602 in the overall process 600, which allows for the input of multiple individual URL parameter units.

FIG. 3E shows an example of such a plurality of individual URL parameter units, according to some embodiments. At this point, the GUI 300e shown by the processor has first and second URL parameter units, 318(1), and 318(2), respectively, appended to the end of the sample URL 306e. In practical terms, for example, if a subscriber that the administrator user was targeting clicked on such a link, the link name, as per parameter unit 318(1), and some function, as per parameter unit 318(2), would be executed and return a value back to web receiver 108, and eventually the generation module 102. As shown in element 304e, the status is now dynamically updated to "Two Parameters" from one parameter. Moreover, when the user maneuvers the pointer 310e to a location near any URL parameter unit, as shown in FIG. 3E, a trash can icon 316e may appear. This enables the user only to delete individual parameter units in a modular fashion, where prompt 320e is displayed. If the user clicks delete 322e, then the URL parameter unit is deleted. Otherwise if the user clicks cancel 324e, then the URL parameter unit is not deleted.

For example, if the user clicked the icon 316e displayed in FIG. 3E, this would only delete the 318(1) portion of the sample URL, wherein the 306e and 318(2) portions would remain intact. In this manner, the user would not have to retype parameters and could take out parameters in the interior of the URL without any harm, increasing efficiency. In the ampersand appearing after 318(1) and before 318(2) is automatically added by the GUI, and when one of the URL parameter units (318(1) or 318(2)) is removed, then the ampersand is also removed. Conversely, the Add Parameter button 308e functions in a manner similar to the analogous Add Parameter button 310a in FIG. 3A, wherein a user can keep adding as many parameters as needed.

In some embodiments, the user may be able to select individual URL parameter units, such as 318(1) or 318(2), by clicking on them with the pointer 310e. A box may be drawn around a respective URL parameter unit when it is selected in this matter. The user may be able to click again on the URL parameter unit to unselect it, at which point the drawn box may disappear. If the user selects an individual URL parameter unit, and then clicks the Add Parameter 308e button, then a parameter may be added immediately after the selected URL parameter unit, within the URL parameter string. The URL parameter string comprises the sample URL 306(e), the first parameter 318(1), the second parameter 318(2), and any other added parameters, collectively. For example, if a user selected the URL parameter unit 318(1), and then clicked the Add Parameter button 308e, a new parameter may be added between the URL parameter units 318(1) and 318(2) as shown in the URL parameter string of FIG. 3E. In this manner, a large degree of flexibility is offered to the user in an intuitive manner for placing new parameters they may have forgotten to add previously, in various URL parameter string locations, as desired.

When the user is satisfied with their created URL parameter string, they can click the Save button 314. Upon doing so, the entire URL parameter string can be saved, and displayed in the Parameter Strings Manager GUI 400 of FIG. 4, which is discussed below. It is at this point, in FIG. 3E, that the process moves from step 602 to step 604 in FIG. 6.

At step 604, the multiple inputted individual URL parameter units at step 602 are combined, or concatenated, to make a URL parameter string at the generation module 102. In the case of FIG. 3E, the shown individual URL parameter units, 318(1), 318(2), etc., which have been inputted, are concatenated and combined with the sample URL to form a composite URL parameter string, as described above, which is stored in the primary/secondary memory of the generation module 102, and transferred to the Parameter Strings Manager GUI 400, which will be described.

In other alternative embodiments to FIGS. 3A-3E, if the user administrator is an advanced user familiar with coding concepts, they may use a second GUI 300f shown in FIG. 3F for the inputting and deletion of parameters of a URL parameter unit for a complex string. This GUI 300f may be immediately shown to the user after the GUI 200 of FIG. 2, at step 602 of the process, if the Custom String option 206b is chosen by the user in FIG. 2. This GUI 300f, as shown in FIG. 3F is shown by the processor to the user at step 602 in the process. As in FIGS. 3A-3E, FIG. 3F also first displays the URL parameter string name as chosen by the user (or default if none is chosen) in the name field 302f. The GUI in FIG. 3F also has a Custom String label 304f, wherein no parameter count is displayed. This is because in the custom string, the parameters are not added as separate modular units, but rather everything may be input collectively into a text-editable field 306f, which in an embodiment may be an integrated development environment. This field 306f, along with the Quick functions list of quick functions 308f and customize and sort buttons 318f and 320f, may also appear in the Simple String embodiment described above if the user chooses 206a in FIG. 2, progresses to FIG. 3C, and clicks on the Define Func button 320. In this case, the user may want to define a function in the simple string, wherein an advanced user may use such a box for entering the function only.

In contrast, the embodiment of FIG. 3F may be beneficial for an advanced user to use immediately after the GUI of FIG. 2, because of the speed it offers for input of commonly or previously used functions by the user through an efficient drag-and-drop interface. For example, when one of the list of displayed quick functions 308f is dragged by the user with pointer 310f to the user-editable text input field 306f, this action is detected by the processor of the generation module 102. The quick function 308f, such as "Concat( . . . )" as shown in FIG. 3F, follows the mouse pointer. If it is dropped into the text-editable field, the processor inserts the syntax of the function into the text input field so that the user does not have to type the full function. The user only has to edit the parameter fields within the function (e.g., ObjExtField('EmailSendDefinition', Program Name') within the parameter field of the function Empty( . . . ). Moreover, if the user moves the pointer to the information logo 316f shown for each quick function 308f, a brief usage and explanation of the syntax of each function is shown in a pop-up window to the user, such that the user does not have to go outside of the GUI to search for function explanations. Finally, the user can easily add functions to the list by clicking the customize button 318f, wherein the user may be able to search or choose the quick functions 308f displayed from a selectable list of functions.

The user may also use the sort button 320f, to sort the quick functions as most commonly used functions, previously used, etc. This can be a great help to the user in efficiently inputting code, such as AMPSCRIPT code, JAVASCRIPT code, JSON code, etc., for almost any such scripting language that is usable in this context, by offering inputs in a modular manner, where the user only needs to input text to define the parameters of the functions. When the custom string is complete (which may include several URL parameter units input into the text field 306f), the user may click the Save button 314 to move to the Parameter Strings Manager GUI 400 in FIG. 4, as with the embodiments of FIGS. 3A-3E. As shown above, in the same manner as with FIGS. 3A-3E, clicking the Save button 314 moves the overall process from step 602 to step 604. As previously explained, if the user clicks the Cancel button 312 instead, this would exit the URL Parameter String generation process.

The user then, either from the embodiment of FIGS. 3A-3E, or from the embodiment of 3F, may arrive at the Parameter Strings Manager GUI 400 as described, at step 604 of the process. The Parameter Strings Manager GUI 400 is shown in FIG. 4, as displayed by the processor to the user. In this GUI 400, the label Parameter Strings Manager 402 is displayed at the top. Here, the user can review any composite URL parameter strings they have previously generated. They have the option of going back to FIG. 2 and generating additional strings, by clicking on the Create String button 412. By doing so this action offers the flexibility to the user to create a plurality of simple strings and custom strings and choosing parameters as they please. Then, when they have a set of parameter strings they are content with, and can use for targeting different individuals or groups within their target subscribers, they may click the Create Email button 410, to move forward in the process 600 from step 604. When the Create Email button 410 is created, the overall process 600 moves forward to step 606, to opens the email editor GUI 500 as shown in FIG. 5.

Step 606 of the process allows the administrator user to utilize an email editor and concatenate desired URL parameter strings, generated through multiple iterations of performing steps 602 and 604, on an as-needed basis. The email editor GUI 500 as shown in FIG. 5 may be used by the administrator to concatenate desired URL parameter strings as indicated in step 606. For example, the user can use GUI 500, to write an email or message as part of a coordinate marketing message campaign as described above to target particular individuals or groups of individuals within their subscriber repository 106. A particularly beneficial feature is that a button 504 may be added, wherein when a user moves the pointer 510 over such a button, they can choose any combination of the previously generated URL parameter strings, from the parameter strings manager, for a particular email. In this way, by mixing and matching different parameter strings, different emails can be composed for different target audiences by utilizing GUI 500.

In addition, the same emails may be composed wherein the administrator may want to review different metrics about the same individuals or group of individuals of the target audience at different times, to search for a change in trend or user behavior over time. By offering such a flexibility, this opens up many possibilities for the administrator to obtain analytics about the target audience and get accurate information about their website or business offerings. In addition, a plurality of buttons 504 may be inserted in one email with different combinations of URL parameter strings. Furthermore, instead of button 504, other objects such as hyperlinks or clickable images may be used instead in the body of an email, in the same manner as described above with respect to button 504. When the user is satisfied with the combination of parameter strings for a button 504, they may click 508 to choose and assign such a combination to the button, which automatically concatenates these strings into a composite URL parameter string assigned to the button 504. This represents step 606 of the process of method 600. On the other hand if the user clicks the cancel button 512, any URL parameter string assigned to the button 504 is cleared.

When the user is satisfied with the email they have created in the GUI of FIG. 5, they may click the Run button 514. Once the run button is clicked, the overall process 600 moves to step 608.

Step 608 of the process fetches additional parameters that are needed at runtime from the subscriber repository 106, to be inserted into the composite URL generated at step 606. For example, at this step, the user may first select a portion of subscribers in the repository 106 that the email is to be sent to, including an individual or groups of individuals. This can be done either through a web application interface for accessing subscriber repository 106 as described above, or through a standalone application for accessing subscriber data repository, where the repository 106 may be present in primary/secondary memory of a computing system of the generation module 102 itself, or a separate computing system linked to a computing system of the generation module. When the subscribers that are to be sent the email have been chosen, the process 600, at step 608, runs through these individuals or entire groups of subscribers, and can automatically fill in several of the variables, creating a unique URL link associated with the elements such as button 504 above, for every subscriber to be sent an email. For example, if one of the parameters of the simple string corresponded to identifying information of the subscriber (e.g., age or geographic location), such information may be fetched from the repository 106, for all individuals or groups of individuals to be sent the email, and filled in upon hitting the Run button 514. In this case, as an example, with reference to FIG. 3C, %%subscriber_age%% or %%subscriber_location%%, etc. similar to the parameters displayed in the dropdown list 316c may be filled in.

Then, when all such subscriber information has been filled in, the targeted emails may be sent to the selected subscribers, per step 610 of the process of method 600. At step 610, once parameters have been inserted into the URLs at step 608, and the subscribers to be sent the email are chosen, the emails can then sent to the selected subscribers. This can happen automatically once the Run button 514 is clicked, after the parameters have been filled in.

Finally, when the email is then received by the targeted subscribers, the overall process moves to step 612. Step 612 of the process of method 600 allows for targeted information about a target subscriber to be sent back to the administrator user when the target subscriber clicks on the URLs of step 608 included in the email of step 610. At this step, when targeted subscribers have received the email and click on an element such as button 504 in the email, certain actions may occur to give feedback to the administrator user of the Generation module 102. For example, the URL of the button 504 can take the targeted subscriber to web receiver 108. The web receiver 108, as described above, may include a computing system, such as a web server, etc. Herein, an event listener on the URL that the user is taken to may be hosted on such a server. Such a listener of web receiver 108 may parse any parameters and/or functions that are included in the URL, which may include carrying out processing of additional logic (e.g., for a function), to return a meaningful value. For example, in this manner, the URL may be used to safely encrypt multiple user variables together in one string, such that if a user copied the URL of a button he would not be able to extract anything meaningful. Then, through the decryption and extraction of the action of the event listener module on the web receiver 108, a meaningful result can be decrypted and extracted. Finally, the results of this processing can be sent to generation module 102 in a number of ways. For example, if the generation module 102 includes a hosted cloud computing environment, this sending may be through a notification on a web application. In this case, according to some embodiments, the computing system of the web receiver 108 may form a computing resource of the cloud computing environment. Alternately, notification of this sending can occur by generating and sending an email to the user of the generation module 102, generating and sending a text message to the user of the generation module, etc. For large volumes of data, report sheets and statistics could be automatically generated and sent to the user of the generation module. This concludes step 612 of the process.

To aid in the understanding of method 600 of FIG. 6 as applied to FIGS. 1-5, utilizing the structure of the cloud computing network of FIG. 7, the underlying structure of a computing system 800 of FIG. 8 and the environment 700 of FIG. 7, of an interaction of such a computing system 800 with a cloud computing environment 702, will be described hereafter.

Figure 8:
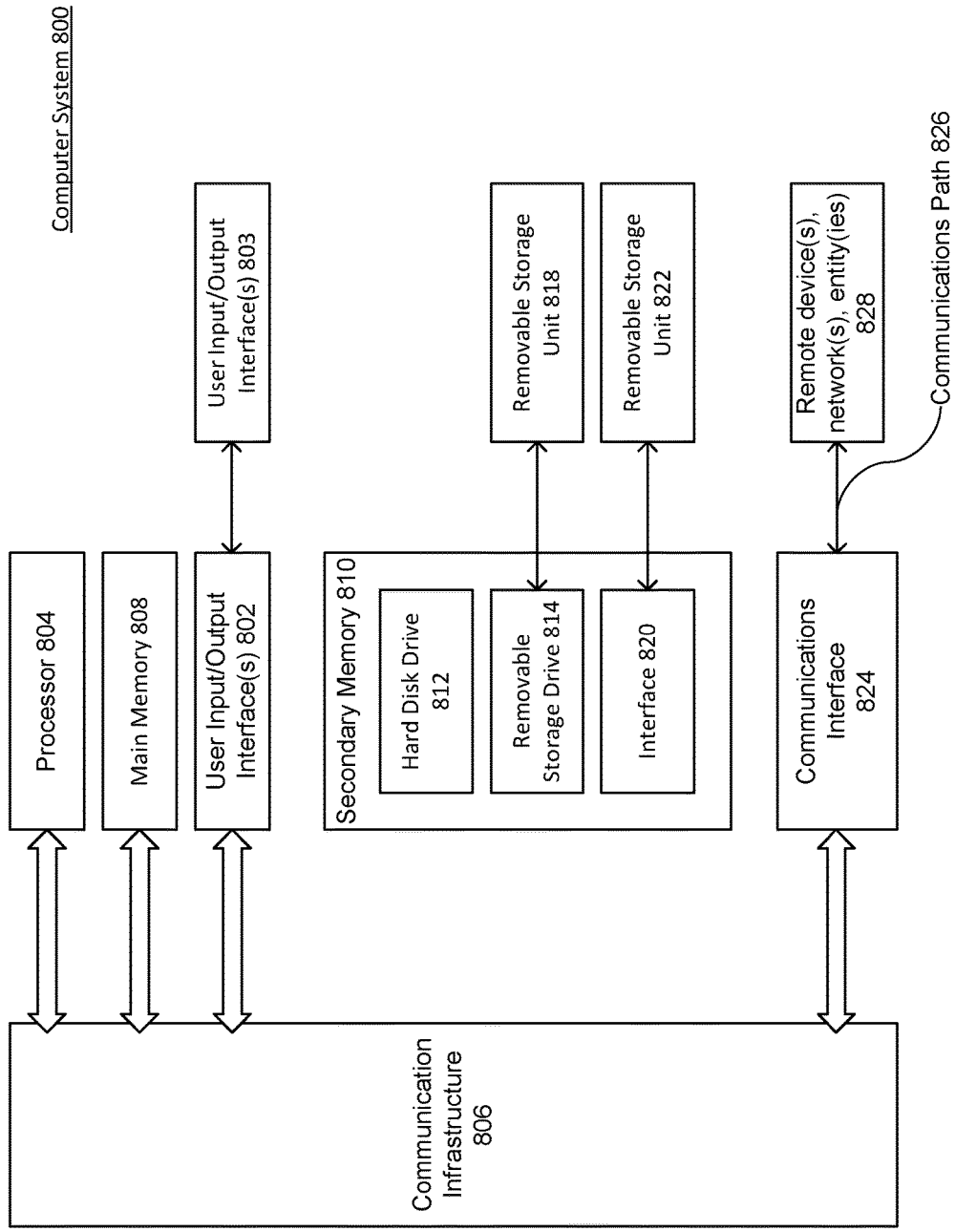
FIG. 8 is an example computer system useful for implementing various embodiments.

The underlying structure of a computer system 800, shown in FIG. 8, can implement a database included in the repository 106, and the sending and receiving of data. Such a computer system 800, may, according to the embodiments describe above, be included as part the generation module 102. Computer system 800 may include one or more processors (also called central processing units, or CPUs), such as a processor 804. Processor 804 may be connected to a communication infrastructure or bus 806.

Computer system 800 may be virtualized, or it may also include user input/output devices 803, such as monitors, keyboards, pointing devices, etc., which may communicate with communication infrastructure 806 through user input/output interface(s) 802.

One or more processors 804 may be a graphics processing unit (GPU). In an embodiment, a GPU may be a processor that is a specialized electronic circuit designed to process read requests for table data received from the subscriber repository 106, which may contain large volumes of subscribers. Through the GPU the data may be able to be processed efficiently in a mass quantity, making it particularly effective in resource-intensive applications such as sending targeted emails to many users simultaneously. The GPU may have a parallel structure that is efficient for parallel processing of large blocks of data, such as mathematically intensive data common to computer graphics applications, images, videos, word-processing documents, PDF files, and the like, including long lists of parameters and functions in URL parameter strings.

Computer system 800 can also include a main or primary memory 808, such as random-access memory (RAM). Main memory 808 can include one or more levels of cache (including secondary cache). Software modules such as those mentioned in the description of process 600 above may be stored e.g., in the primary memory 808 or secondary memory 810 of a computer system 800, such as the generation module 102, etc.

Computer system 800 can also include one or more secondary storage devices or memory 810. Secondary memory 810 may include, for example, a hard disk drive 812 and/or a removable storage device or drive 814, which may combine multiple physical hard disk drive components (such as SSD or SATA-based disk drives) into one or more logical units, or a removable storage unit 818. Removable storage unit 818 may include a computer usable or readable storage device having stored thereon computer software (control logic) and/or data, including remotely accessed network drives. Removable storage unit 818 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote entities 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Figure 7:
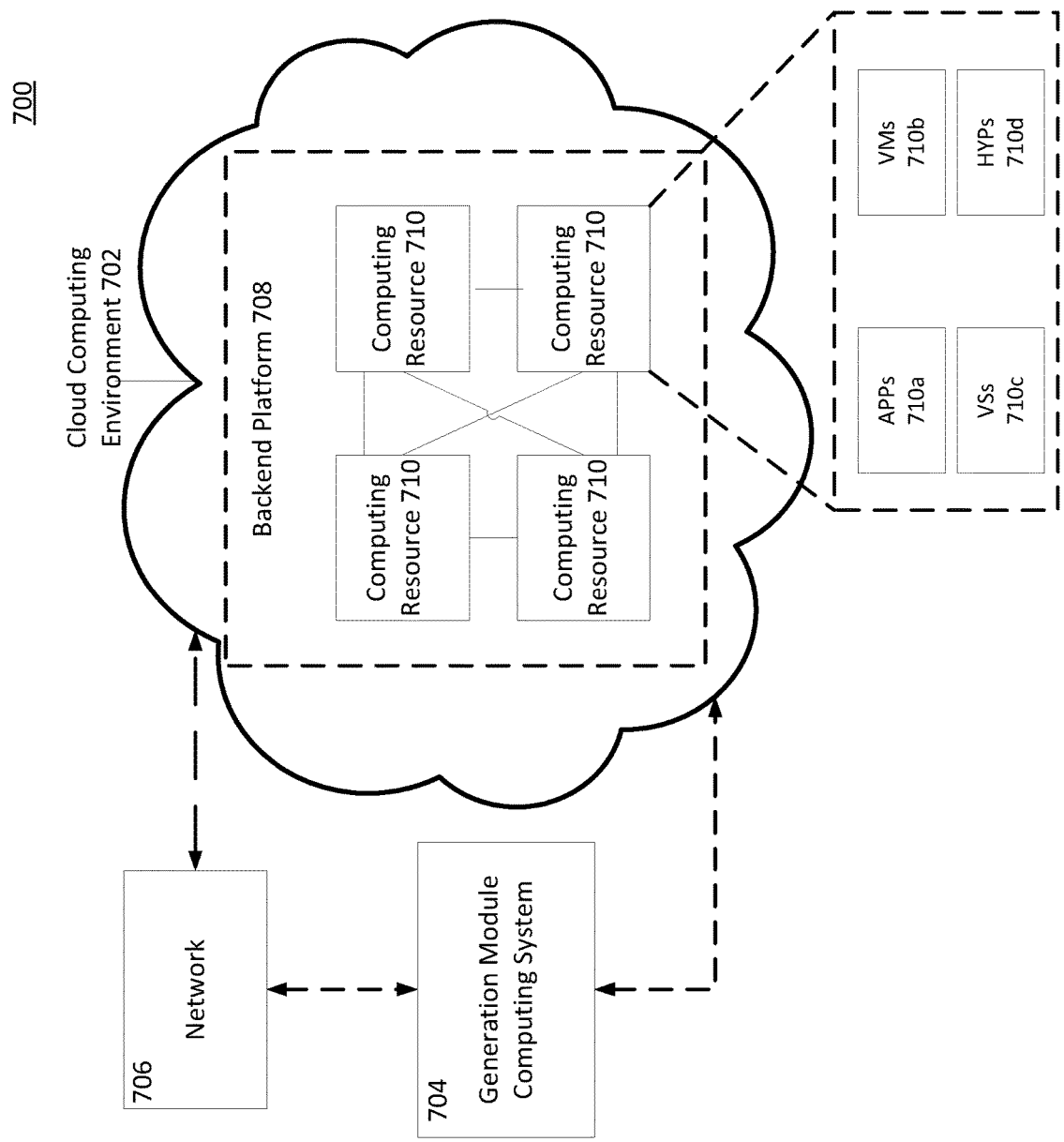
FIG. 7 is a block diagram of an example where a cloud computing environment may be accessed by the generation module, according to some embodiments.

As shown in the block diagram of FIG. 7, cloud computing environment 702 may contain backend platform 708, in an example cloud environment 700 in which systems and/or methods described herein, including the overall process 600 of FIG. 6, may be implemented. The generation module 102 of FIG. 1, described above, may also include a cloud computing environment 702 in some embodiments. The cloud computing environment 702 may be accessed by a generation module computing system 704 in FIG. 7. The generation module computing system 704 may be of the same type of computing system 800 as described above. In this case, the generation module computing system 704 of FIG. 7 may access the cloud computing environment 702 by a communication or network interface 724 as shown in FIG. 7, wherein a network gateway 706 may comprise a remote entity 828 in FIG. 8, accessed by the communications path 826 of the generation module computing system 704.

Alternately, the computing cloud environment 702 itself may correspond to a remote entity 828 in FIG. 8, and may be accessed directly by the user computing system 704 through a communications path 826, for example through an application protocol interface (API), eliminating the need for a network gateway 706 (both options are shown in FIG. 7, wherein the flow path above the generation module computing system 704 uses a network gateway 706, and the flow path below the user computing system 704 connects directly to the cloud computing environment 702, both shown using dashed bi-directional lines). As described above, if the database of the subscriber repository 106 is stored in the primary memory 808 and/or secondary memory 810 of a cloud computing environment 702 included as part of the generation module 102, then an administrator user of the generation module 102 may access the database using the generation module computing system 704. Alternately the database may be accessible through an application protocol interface (API). Such a web application 710a or API, respectively, would be stored and hosted within the 808 and/or secondary memory 810 of computing resources 710 of the cloud environment 700 included as part of the generation computing model.

Any applicable data structures, file formats, and schemas in computer system 800, as used in FIG. 8 and FIG. 7, may be derived from standards including but not limited to JavaScript Object Notation (JSON), Extensible Markup Language (XML), Yet Another Markup Language (YAML), AMPSCRIPT, JAVASCRIPT, JSON, Extensible Hypertext Markup Language (XHTML), Wireless Markup Language (WML), MessagePack, XML User Interface Language (XUL), or any other functionally similar representations alone or in combination, and may be used for sending or receiving data. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Computer system 800 may be a client or server, as described in the case of web receiver 108 above, accessing or hosting any applications and/or data through any delivery paradigm, including but not limited to remote or distributed cloud computing solutions such as cloud computing environment 702 as explained above; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms. An example of where the computer system 800 may be a server is described above with reference to the web receiver 108. Event listeners for webpages accessed by the user, including webpage form listeners, webpage frame listeners, mouse listeners, or keyboard listeners, may be implemented by software modules present in the primary memory 808 or secondary memory 810 of such a web receiver 108, comprising a server 800.

In addition to embodiments of the web application 710a that access the repository 106 as described above, there can be some other embodiments using the structure of computing system 800. For example, in implementing the database of the repository 106, as an example approach, for storing and accessing its constituent data objects, the computer system 800 may use an in-memory database with persistence, which may store and access data objects from the primary memory 808 of the computer system 800 with a transaction log for persistence being stored in secondary memory 810. Alternately, the computer system 800 may use secondary memory 810 entirely to store the repository, or may implement a more frequently accessed portion of the data objects in an in the primary memory 808, and a less frequently accessed portion of the data objects in secondary memory 810. Even in the embodiment of the web application 710a, such an application may serve as a front-end accessing tool, wherein the actual database of the repository may be stored on a computing resource 710 of the cloud. Such a computing resource comprises a computer system 800, and the database may be stored in the same manner as described here with respect to the computing system 800.

The devices of environment 100 may be connected through wired connections, wireless connections, or a combination of wired and wireless connections. In an example embodiment, one or more portions of the data transfer environment 100 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The cloud computing resources 710 may communicate with other cloud computing resources 710 via wired connections, wireless connections, or a combination of wired or wireless connections.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for using a graphical user interface (GUI) for generating a composite uniform resource locator (URL) parameter string, the method comprising:
   obtaining, by at least one processor, a first parameter from the GUI;
   displaying, by the at least one processor, operations and equivalency conditions based on the first parameter, within the GUI;
   obtaining, by the at least one processor, from the GUI, one operation or equivalency condition from the operations and equivalency conditions based on the first parameter;
   obtaining, by the at least one processor, from the GUI, a second parameter;
   translating, by the at least one processor, the first parameter, the one operation or equivalency condition, and the second parameter, collectively, into a first individual URL parameter unit comprising browser-recognizable syntax; and
   concatenating, by the at least one processor, the first individual URL parameter unit with a second individual URL parameter unit to form a composite URL parameter string.

2. The computer-implemented method of claim 1, wherein the step of obtaining, by the at least one processor, a first parameter from the GUI further comprises:
   displaying, by the at least one processor, a list of pre-populated parameter values to be chosen by a user to be automatically input into an editable text field;
   obtaining user input, by the at least one processor, from the editable text field; and
   assigning, by the at least one processor, the obtained user input as a value of the first parameter.

3. The computer-implemented method of claim 2, wherein the method further comprises:
   obtaining, by the at least one processor, a desired platform; and
   displaying, by the at least one processor, the list of pre-populated parameter values based on the desired platform.

4. The computer-implemented method of claim 1, wherein the method further comprises:

inserting, by the at least one processor, a button in a body of an email;

assigning, by the at least one processor, a URL hyperlink to the button including a value of the composite URL parameter string;

fetching, by the at least one processor, user data from a repository at a designated runtime to fill parameters in the first and second individual URL parameter units of the composite URL parameter string; and sending, by the at least one processor, the email to one or more recipients.

5. The computer-implemented method of claim 4, wherein the method further comprises:

receiving, by the at least one processor, a notification of when an individual or a sub-group of recipients within the one or more recipients has clicked the button in the body of the email.

6. The computer-implemented method of claim 1, wherein the second parameter is a function, wherein the step of obtaining the second parameter from the GUI further comprises:

displaying, by the at least one processor, a second GUI comprising a list of selectable functions adjacent to an editable text field;

obtaining user input, by the at least one processor, from the editable text field of the second GUI; and setting, by the at least one processor, the obtained user input as a value of the second parameter.

7. The computer-implemented method of claim 6, wherein the method further comprises:

(a) receiving, by the at least one processor, a first user input in the second GUI;

(b) detecting, by the at least one processor, that the first user input indicates a user dragging action of one of the selectable functions in the list of selectable functions to the editable text field;

(c) in response to step (b), by the at least one processor, displaying a moving of the one of the selectable functions to follow a user cursor or pointer to the editable text field; and (d) upon termination of the user dragging action into the editable text field, by the at least one processor, automatically inserting text corresponding to the one of the selectable functions in the editable text field, and prompting the user for additional inputs related to the one of the selectable functions.

8. A system comprising:

a memory; and at least one processor coupled to the memory and configured to:

generate a graphical user interface (GUI);

obtain a first parameter from the GUI;

display operations and equivalency conditions based on the first parameter, within the GUI;

obtain a selection of one operation or equivalency condition of the displayed operations and equivalency conditions from the GUI;

obtain a second parameter from the GUI;

translate the first parameter, the selected operation or equivalency condition, and the second parameter, collectively, into a first individual uniform resource locator (URL) parameter unit comprising browser-recognizable syntax; and concatenate the first individual URL parameter unit with a second individual URL parameter unit to form a composite URL parameter string.

9. The system of claim 8, wherein to obtain the first parameter from the GUI the at least one processor is configured to:

display a list of pre-populated parameter values to be chosen by a user to be automatically input into an editable text field;

obtain user input from the editable text field displayed on the GUI; and assign the obtained user input as a value of the first parameter.

10. The system of claim 9, wherein to obtain the first parameter from the GUI the at least one processor is configured to:

obtain a desired platform input value from the GUI; and display the list of pre-populated parameter values based on the desired platform.

11. The system of claim 8, wherein the at least one processor is further configured to:

insert a button in a body of an email;

assign a URL hyperlink to the button comprising a value of the composite URL parameter string;

fetch user data from a repository at a designated runtime to fill parameters in the first and second individual URL parameter units of the composite URL parameter string; and send the email to one or more recipients.

12. The system of claim 11, wherein the at least one processor is further configured to:

receive a notification of when an individual or a sub-group of recipients within the one or more recipients has clicked the button in the body of the email.

13. The system of claim 8, wherein the second parameter is a function, wherein, to obtain the second parameter from the GUI, the at least one processor is configured to:

generate a second GUI comprising a list of selectable functions adjacent to an editable text field;

display the second GUI;

obtain user input from the editable text field of the second GUI; and assign the obtained user input as a value of the second parameter.

14. The system of claim 13, wherein to obtain the second parameter from the GUI the at least one processor is configured to:

(a) receive a first user input in the second GUI;

(b) detect that the first user input indicates a user dragging action of one of the selectable functions in the list of selectable functions to the editable text field;

(c) in response to step (b), display a moving of the one of the selectable functions to follow a user cursor or pointer to the editable text field; and (d) upon termination of the user dragging action into the editable text field, automatically insert text corresponding to the one of the selectable functions in the editable text field, and prompt the user for additional inputs related to the one of the selectable functions.

15. A non-transitory computer-readable medium having instructions stored thereon that, when executed by at least one computing device, cause the at least one computing device to perform operations comprising:

generating a graphical user interface (GUI);

obtaining a first parameter from the GUI;

displaying operations and equivalency conditions based on the first parameter, within the GUI;

obtaining from the GUI, one operation or equivalency condition from the operations and equivalency conditions based on the first parameter;

obtaining from the GUI, a second parameter;

translating the first parameter, the one operation or equivalency condition, and the second parameter, collectively, into a first individual uniform resource locator (URL) parameter unit comprising browser-recognizable syntax; and concatenating the first individual URL parameter unit with a second individual URL parameter unit to form a composite URL parameter string.

16. The non-transitory computer-readable medium of claim 15, wherein the obtaining the first parameter from the GUI comprises:

displaying a list of pre-populated parameter values to be chosen by a user to be automatically input into the editable text field; obtaining user input from an editable text field; and assigning the obtained user input as a value of the first parameter.

17. The non-transitory computer-readable medium of claim 16, wherein the obtaining the first parameter from the GUI comprises:

obtaining, by at least one processor, a desired platform;

displaying the list of pre-populated parameter values based on the desired platform.

18. The non-transitory computer-readable medium of claim 15, wherein the operations further comprise:

inserting a button in a body of an email;

assigning a URL hyperlink to the button comprising a value of the composite URL parameter string;

fetching user data from a repository at a designated runtime to fill parameters in the first and second individual URL parameter units of the composite URL parameter string; and sending the email to one or more recipients.

19. The non-transitory computer-readable medium of claim 18, wherein the operations further comprise:

receiving a notification of when an individual or a subgroup of recipients within the one or more recipients has clicked the button in the body of the email.

20. The non-transitory computer-readable medium of claim 15, wherein the second parameter is a function, wherein the obtaining the second parameter from the GUI comprises:

displaying a second GUI comprising a list of selectable functions adjacent to an editable text field;

obtaining user input from the editable text field of the second GUI; and setting the obtained user input as a value of the second parameter.

* * * * *